United States Patent

Leone

[11] Patent Number: 5,961,242
[45] Date of Patent: Oct. 5, 1999

[54] BRACKET FOR A FENCING SYSTEM

[75] Inventor: Nicola Leone, Mississauga, Canada

[73] Assignee: Iron Eagle Industries Inc., Mississauga, Canada

[21] Appl. No.: 08/980,244

[22] Filed: Nov. 28, 1997

[51] Int. Cl.⁶ .................................................. B25G 3/00
[52] U.S. Cl. ........................... 403/234; 403/340; 256/68; 248/228.1; 248/230.1
[58] Field of Search .................................. 403/340, 234, 403/233, 230, 235, 237, 192, 187; 256/59, 65, 68; 248/229.2, 228.1, 228.4, 230.1, 230.4

[56]                References Cited

U.S. PATENT DOCUMENTS

| 444,960 | 1/1891 | Priday ................................ 403/233 X |
| 1,261,213 | 4/1918 | Clay ....................................... 403/233 |
| 2,474,727 | 6/1949 | Denier ................................ 403/340 X |
| 4,128,353 | 12/1978 | Lauterbach .......................... 403/340 X |
| 4,915,535 | 4/1990 | Willetts ................................ 403/234 X |
| 5,498,098 | 3/1996 | Cairns .................................. 403/340 X |

*Primary Examiner*—Terry Lee Melius
*Assistant Examiner*—William L. Miller
*Attorney, Agent, or Firm*—Arne I. Fors

[57]                ABSTRACT

A novel bracket assembly for slidably mounting beams such as rails upon a column such as posts and for interconnecting abutting beams is disclosed for forming a continuous support frame for fencing and fence-like systems. The bracket assembly comprises identical first and second bracket components each having a pair of opposed, spaced-apart side walls joined by a web defining a collar for slidably engaging the post therebetween, opposed sleeve side walls defining a split sleeve for receiving an end of a beam therein, each collar having a recess extending from the center-line of the sleeve, and clamping and securing the sleeve side walls and collar side walls towards each other to secure the beam to the bracket and to clamp the bracket to the rail, whereby inversion of the second bracket component relative to the first bracket component on a column will nest the recesses of the bracket components together and align the sleeves at about the same height on a column.

10 Claims, 5 Drawing Sheets

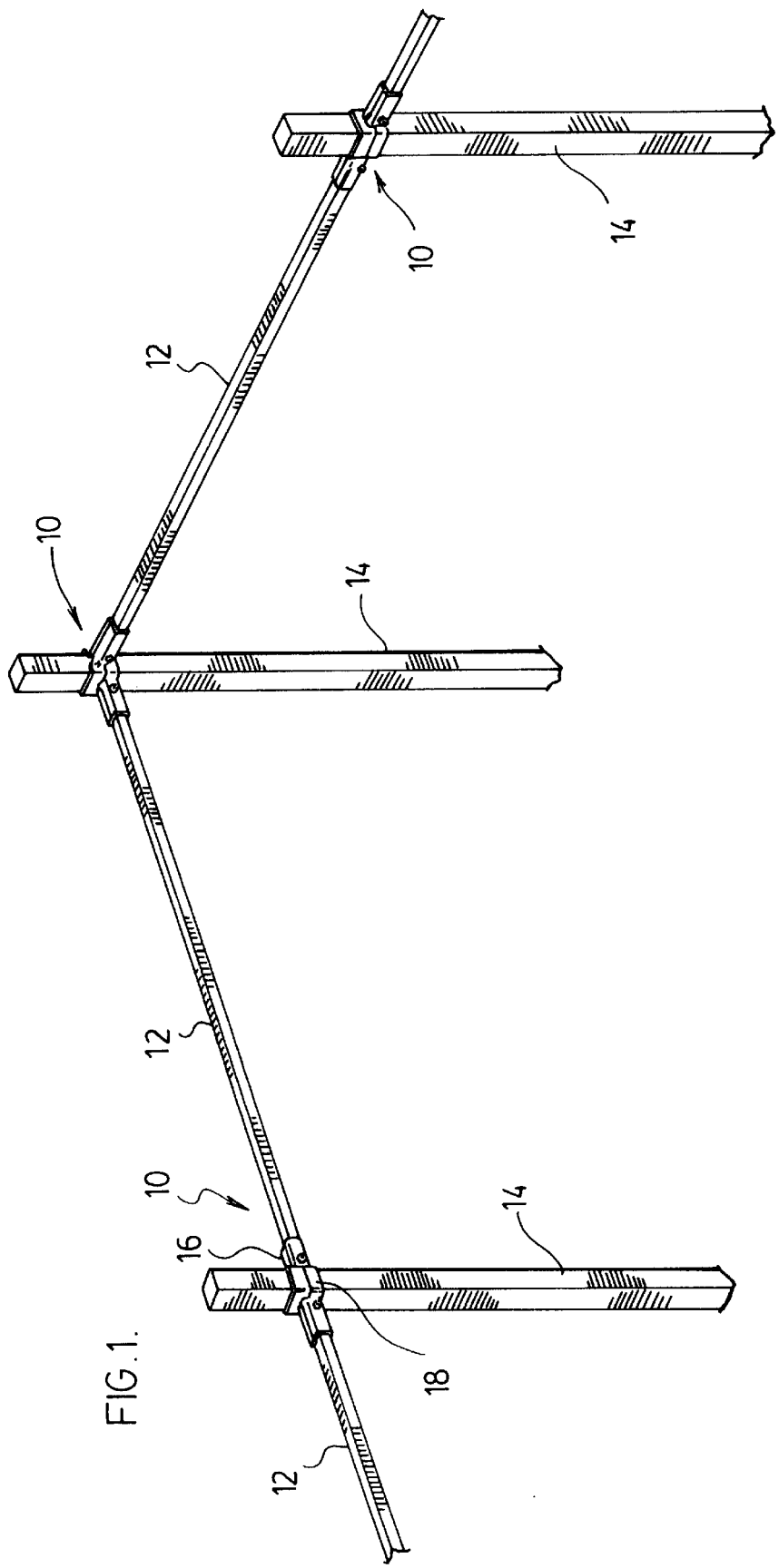

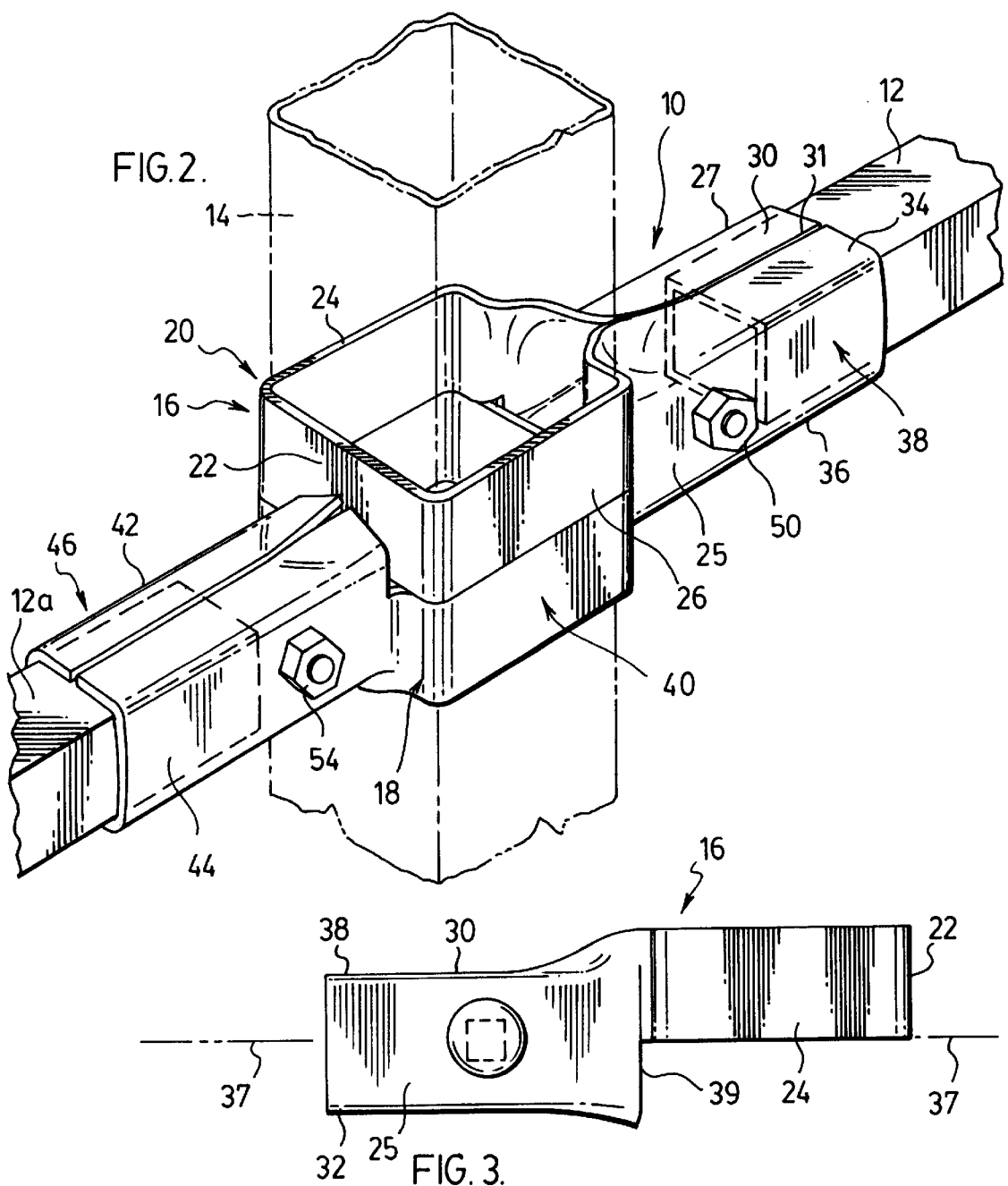

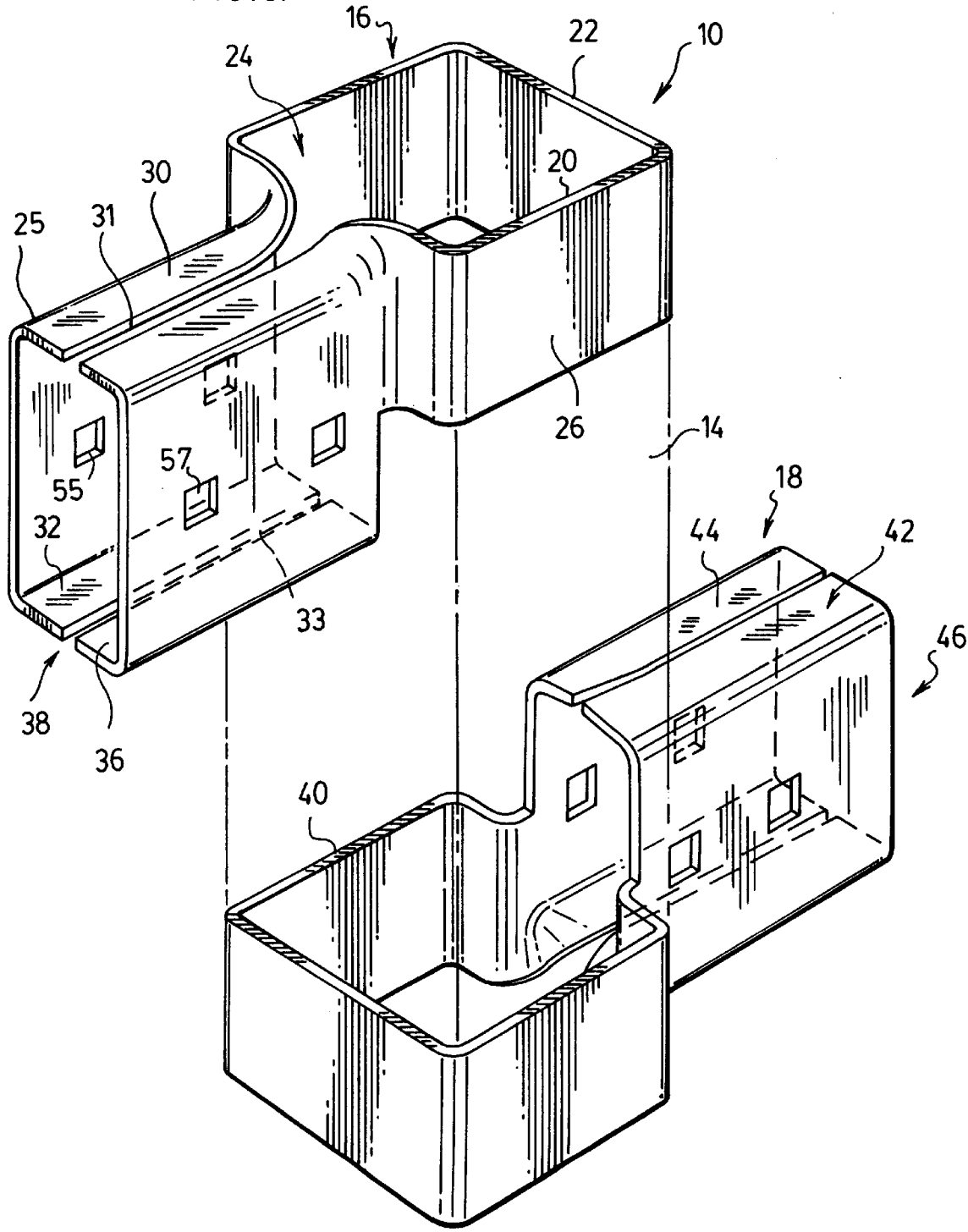

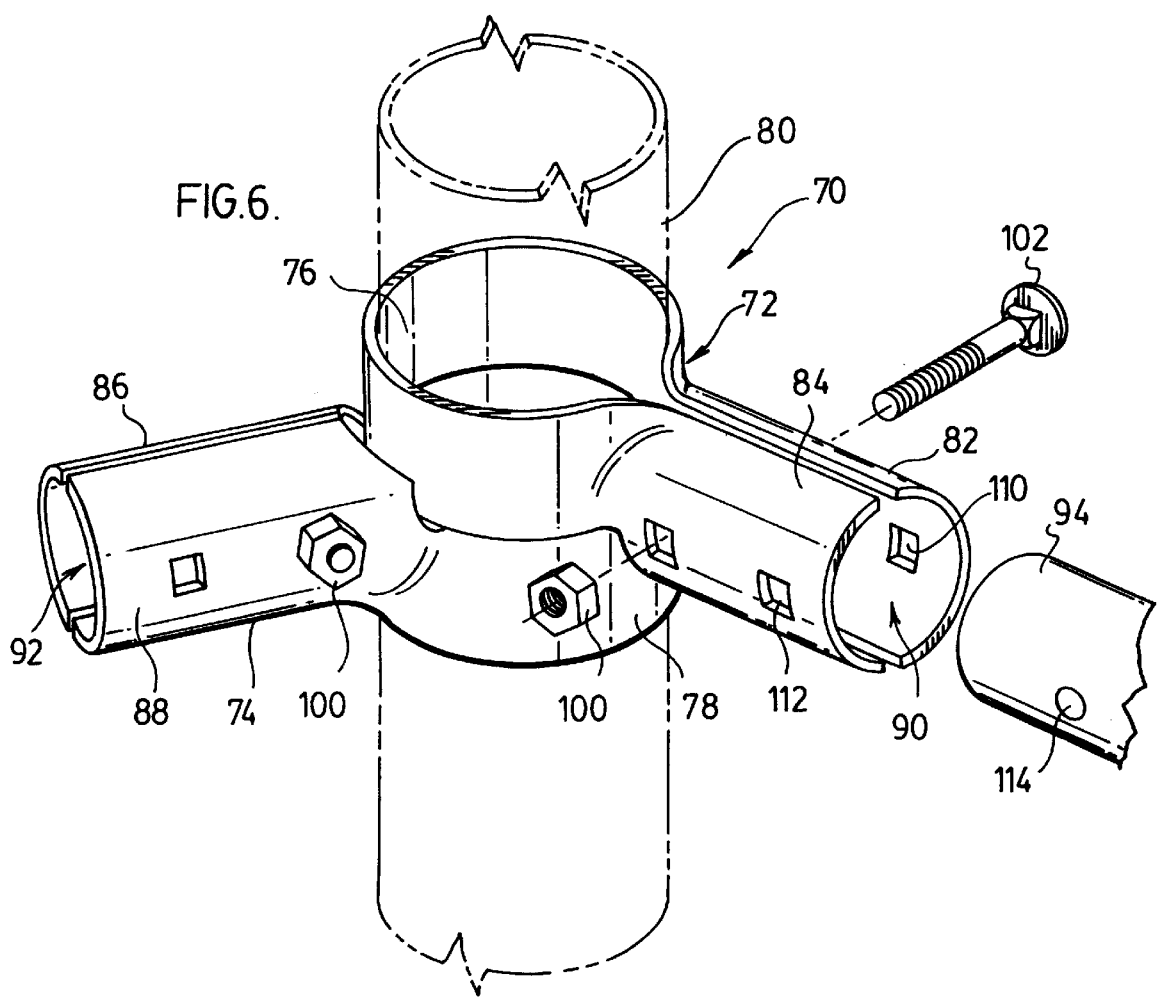
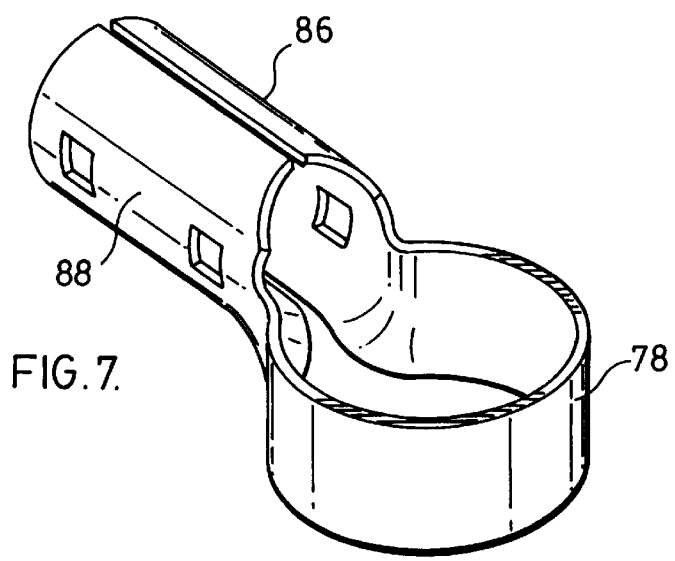

BRACKET FOR A FENCING SYSTEM

BACKGROUND OF THE INVENTION

(i) Field of The Invention

The present invention relates to a bracket for use in a system for erecting fence-like systems and, more particularly, relates to a bracket for attaching a beam to a column.

(ii) Description of the Related Art

Commercial and residential fencing typically defines the metes and bounds of a property. A fencing system may surround the whole or a portion of a physical property, serving one or more purposes related to function and ornamentation, including the provision of privacy, security and visual appeal. The shape and area of a fence may be determined in part by the slope of the terrain in which the posts are to be embedded, the need to conform with setback regulations which may restrict how and where to place the fencing, obstacles surrounding or on the property, including corners, trees, indentations and the like. While different styles of fencing are available, known styles include post-and-rail and picket fencing. Materials for such fencing include iron, metal, vinyl and wood.

The construction of fencing and fence-like systems such as play structures and modular pannelled units framed by a column and at least one beam, entails the assembly of columns such as posts and beams such as rails, individually or in series. Posts serving as structural supports are embedded in the terrain at positions along the fencing. Various known fastening means such as brackets and nails connect rails to posts, which, in combination, form the frame of a fence panel or complete fencing system. A fence-like structure thus has a range of adjustability limited by placement of the connection between rails and post. When the surface of the terrain is uneven, the connection may not be adaptable to provide the range required for a level, uppermost fence perimeter. Further, the installer may be required to awkwardly place a post at corners and obstacles of the property, being confined by the area of a fencing panel, or the height of a rail. Further, the installer may be required to drill holes in a metal post and rail to create a connection, occasionally resulting in excessive complication for the amateur installer.

SUMMARY OF THE INVENTION

It is a principal object of the present invention to provide a bracket assembly for slidably mounting beams such as rails upon a column such as posts and for interconnecting abutting beams, thereby forming a continuous support frame for fencing and fence-like systems.

It is a further object to provide a novel modular fencing system with a universal bracket for use as a line bracket or corner bracket of a frame of the system. In accordance with the present invention, a bracket assembly for connecting beams to a columns is provided comprising identical first and second bracket components each having a pair of opposed, spaced-apart side walls, integrally joined by a web defining a collar adjacent the web for slidably engaging the post therebetween, opposed sleeve side walls formed by extensions of said opposed, spaced-apart side walls adjacent the collar, defining a split sleeve for receiving an end of a beam therein, each said collar having a recess extending from the center-line of the sleeve, and clamping and securing means for biasing the sleeve side walls and collar side walls towards each other to secure the beam to the bracket and to clamp the bracket to the rail, whereby inversion of the second bracket component relative to the first bracket component on a column will nest the recesses of the bracket components together and align the sleeves at about the same height on a column. Said clamping and securing means comprise a threaded bolt extending through holes in the opposed sleeve side walls, and optionally through a hole in the end of the beam received in the sleeve, and a nut threaded on the bolt for rotation thereon for drawing the sleeve side walls and the collar side walls towards each other, thereby securing the end of the beam to the bracket sleeve and clamping the bracket on the column.

In accordance with a further aspect of the present invention, a bracket assembly for connecting fence rails to a post is provided comprising identical first and second bracket components each having a pair of opposed, spaced-apart side walls, joined by a web defining a collar adjacent the web for slidably engaging the post therebetween, and opposed sleeve side walls formed by extensions of said opposed, spaced-apart side walls defining a split sleeve for receiving an end of a rail therein, each said collar having a recess extending from the center-line of the sleeve, and clamping and securing means for biasing the sleeve side walls and collar side walls towards each other to secure the rail to the bracket and to clamp the bracket to the post, whereby inversion of the second bracket component relative to the first bracket component on a post will nest the recesses of the bracket components together and align the sleeves at about the same height on a post. Said clamping and securing means comprise a threaded bolt extending through holes in the opposed sleeve side walls and through a hole in the end of the rail received in the sleeve and a nut threaded on the bolt for rotation thereon for drawing the sleeve side walls and the collar side walls towards each other, thereby securing the end of the rail to the bracket sleeve and clamping the bracket on the post.

In accordance with a further aspect of the invention, there is a provided a method of assembling a fence-like structure from pre-formed modular panels comprising the steps of selecting a pair of opposed bracket components, each of said bracket components comprising spaced-apart side-walls joined integrally by a web defining a collar operative for slidably engaging a column therebetween, and opposed sleeve sidewalls formed by extension of said opposed spaced-apart sidewalls defining a split sleeve for receiving an end of a beam therein, each of said collars having a recess extending from the axis of the sleeve; inverting one of said bracket components relative to the other to facilitate placement of each of the collars whereby each of the collars nest together when placed in axial alignment and slidably inserting a column within said collars arranged in a nesting position; slidably inserting the end of a beam within each of the said sleeves for snug securement within each of said sleeves in said nesting position, and clamping and securing said sleeve sidewalls and said collar sidewalls toward each other to secure the end of the beam in substantial abutment to the column and to secure the bracket component on the column.

BRIEF DESCRIPTION OF THE DRAWINGS

Preferred embodiments of the present invention will now be described, by way of example only, with reference to the attached drawings, wherein:

FIG. 1 is a perspective view of a line bracket assembly of the present invention showing a tubular rail on a tubular post having a square cross-section;

FIG. 2 is a perspective view of the components of the bracket assembly of the invention shown in FIG. 1 assembled on a post shown by ghost lines;

FIG. 3 is a side elevation of a component of the bracket assembly shown in FIG. 1;

FIG. 5 is a perspective view of another embodiment of my invention vertically separated to more clearly show the structure thereof;

FIG. 6 is a perspective view of another embodiment of bracket assembly for round posts and beams in a corner configuration; and FIG. 7 is a perspective view of a component illustrated in FIG. 6.

DESCRIPTION OF THE PREFERRED EMBODIMENTS

Figure 4:
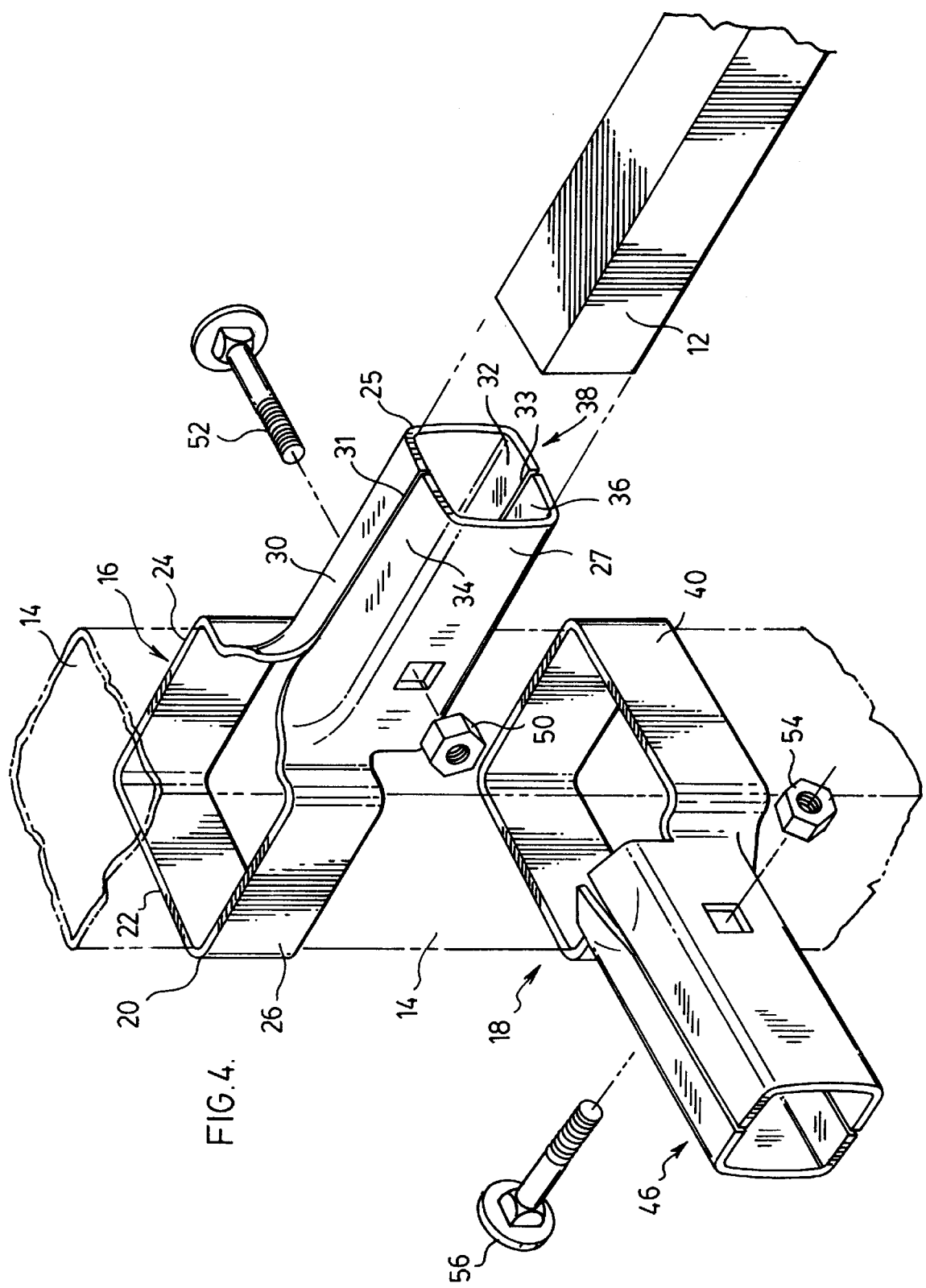
FIG. 4 is an exploded perspective view of a bracket assembly of the invention shown in FIG. 1 in a corner configuration.

With reference to FIGS. 1–4 of the drawings, the bracket assembly 10 of the invention for securing rails 12 to a post 14 comprises first and second bracket components 16, 18 formed by die pressing from a flexible metal such as galvanized steel. Bracket components 16 has a collar 20 comprised of a bight or web 22 joining opposed side walls 24, 26 having an appropriate shape and dimensions for a snug sliding fit on post 14 having a rectangular, preferably square, cross-section.

Top and bottom edges 30, 32 of the extension 25 of side wall 24 and top and bottom edges 34, 36 of the extension 27 of side wall 26 are bent inwardly to define a rectangular sleeve 38 to receive an end of tubular rail 12 in a snug sliding fit. Opposed top edges 30, 34 and bottom edges 32, 36 are spaced apart to define narrow slots 31, 33 therebetween for reasons which will become apparent as the description proceeds.

The bottom half of the web 22 and side walls 24, 26 of collar 20 are cut away from the height of the longitudinal centre line or axis 37 of sleeve 38 adjacent sleeve 38 at 39 to provide a collar bottom recess or cut-out.

Bracket component 18 is the mirror image of component 16 having a collar 40 formed integral with side wall extensions 42, 44 which define split sleeve 46. Collar 40 has the upper half thereof cut away from the longitudinal center axis line 37 of sleeve 46, common to both sleeves 38, 46 when installed on a post, to provide a collar top recess.

In use, bracket component 18 with collar recess facing upwardly is slid onto post 14 to a desired height and bracket component 16 with collar recess facing downwardly is slid onto collar component 18 for nesting of the opposed collar recesses together. FIG. 2 illustrates a line bracket arrangement with fence rails 12, 12a in linear alignment. FIG. 4 illustrates an exploded perspective view of the components prior to assembly in a corner arrangement. Nut 50 is tightened on threaded bolt 52 which passes through side wall extensions 25, 27 to draw the opposed side walls 24, 26 of bracket component 16 together to secure rail 12 in sleeve 38 and to clamp collar 20 onto post 14.

In like manner, nut 54 is tightened on bolt 56 to secure rail 12a to sleeve 46 of bracket component 18 and to clamp collar 40 on post 14. Rails 12, 12a are thereby attached in linear axial alignment to post 14, as viewed in FIG. 2.

A single bracket component illustrated in FIG. 3, with recess facing downwardly, can be used as an end bracket.

FIG. 4 illustrates a corner connection of fence rails. The adjacent collar recesses permit nesting of the bracket components in the corner arrangement.

FIG. 5 illustrates a larger version of bracket assembly of the invention in which a second pair of holes 55, 57 is formed in side extensions 25, 27 to allow a securing bolt, not shown, to pass through a mating hole in rail 12.

FIG. 6 illustrates another embodiment of bracket assembly 70 in which the first and second bracket components 72, 74 comprise cylindrical collars 76, 78 having an inside diameter permitting a snug sliding fit on round post 80. The opposed side walls 82, 84 and 86, 88 of collars 76, 78 respectively are bent inwardly to define split cylindrical sleeves 90, 92 to receive the ends of tubular rails typified by rail 94 having a circular cross-section.

The bottom half of collar 76 and the top half of collar 78 are cut away from the centre line of the respective sleeves 90, 92 to allow nesting of the collars with each other whereby the rails 94 would be aligned with each other at the same height on post 80 when assembled.

Sleeves 90, 92 can be axially aligned on post 80 for linear alignment with each other, pivoted to 90° for a corner installation, or adjusted to an angle between about 45° to about 180°. The split cylindrical sleeves 90, 92 with the ends of rails 94 inserted therein are closed by tightening nut 100 on threaded bolt 102 to for example secure rail 94 to sleeve 90 and to clamp collar 76 on post 80 and by tightening nut 100 on a bolt 102 to secure rail a 94 to sleeve 92 and to clamp collar 78 on post 80, with the collar recesses nesting with each other. A second nut and bolt, not shown, passes through opposed sleeve holes 110, 112 and through mating hole 114 in rail 94 to positively secure the rails to the brackets.

Although the description of the embodiments of the bracket assembly has proceeded with reference to a fence rail and post assembly, it will be understood that the bracket assembly can be used for beams and columns of a play structure or minigym for children.

The above-described embodiments of the invention are intended to be examples of the present invention and alterations and modifications my be effected thereto, by those of skill in the art, without departing from the scope and purview of the invention which is defined solely by the claims appended hereto.

I claim:

1. A bracket assembly for connecting beams to a column comprising identical first and second bracket components each having a pair of opposed, spaced-apart side walls joined by a continuous web defining a collar adjacent the web for slidably engaging the column therebetween, opposed sleeve side walls formed by extensions of said opposed, spaced-apart side walls defining a split sleeve having a longitudinal opening for receiving an end of a beam therein, each said collar having a recess extending from the opening of the sleeve, and clamping and securing means for biasing the sleeve side walls and collar side walls towards each other to secure the beam to the bracket and to clamp the bracket to the column, whereby inversion of the second bracket component relative to the first bracket component will nest opposed collars together such that the opposed collars are axially aligned and overlap to form a continuous opening therethrough.

2. A bracket assembly as claimed in claim 1 wherein said column is a fence post and said beam is a fence rail.

3. A bracket assembly as claimed in claim 2 in which the collar is square for receiving said column or a post having a square cross-section.

4. A bracket assembly as claimed in claim 1 in which the opposed sleeve side walls which define said split sleeve have a rectangular cross-section for receiving said beam or a rail.

5. A bracket assembly as claimed in claim 4 in which the rectangular cross-section is square.

6. A bracket assembly as claimed in claim 1 in which the opposed, spaced-apart side walls joined by the web define said collar to be cylindrical adjacent the web for receiving said column or a post having a round cross-section.

7. A bracket assembly as claimed in claim 6, in which the opposed sleeve side walls which define said split sleeve have a circular cross-section for receiving said beam or a rail having a circular cross-section.

8. A bracket assembly as claimed in claim 1 in which the clamping and securing means are a nut and bolt combination.

9. A method of assembling a fence-like structure comprising the steps of selecting a pair of opposed bracket components, each of said bracket components comprising spaced-apart side-walls joined integrally by a continuous web defining a collar operative for slidably engaging a column therebetween, and opposed sleeve sidewalls formed by extensions of said opposed spaced-apart sidewalls defining a split sleeve having an opening for receiving an end of a beam therein, each of said collars having a recess extending from the opening of the sleeve; inverting one of said bracket components relative to the other to facilitate placement of each of the collars at a desired height on the column, whereby the collars nest together when placed in axial alignment, and slidably inserting the column within said collars when arranged in a nesting position; slidably inserting the beam into each of the split sleeves for placement of each beam in linear alignment perpendicular relative to the column, an end of each beam in substantial abutment to the column; and clamping and securing said sleeve sidewalls and collar sidewalls toward each other for securing each of the beams to the respective bracket component and the bracket components to the column.

10. A method as claimed in claim 9 wherein said column is a fence post and said beam is a fence rail.

\* \* \* \* \*